United States Patent [19]
Valy et al.

[11] Patent Number: 5,150,741
[45] Date of Patent: Sep. 29, 1992

[54] DEVICE FOR CONTROLLING THE GAS STREAM DELIVERED BY A PRESSURIZED GAS RESERVOIR AND A GAS SUPPLY SYSTEM COMPRISING SUCH A DEVICE

[75] Inventors: Yves H. G. Valy, Medard en Jalles; Pascal D. Coquet, Bordeaux; Michel Amagat, St Aubin du Medoc, all of France

[73] Assignee: Societe Anonyme dite: Aerospatiale Societe Nationale Industrielle, Paris, France

[21] Appl. No.: 631,331

[22] Filed: Dec. 20, 1990

[30] Foreign Application Priority Data

Dec. 27, 1989 [FR] France ................. 89 17265

[51] Int. Cl.[5] ............... B67D 1/12; B65B 31/04
[52] U.S. Cl. ..................... 141/18; 141/46; 251/63.5
[58] Field of Search ........... 141/3, 18, 46, 50, 51; 251/63.5

[56] References Cited

U.S. PATENT DOCUMENTS

| | | | |
|---|---|---|---|
| 3,556,135 | 1/1971 | Koyama et al. | 137/501 |
| 3,910,553 | 10/1975 | Boylan | 251/205 |
| 4,657,224 | 4/1987 | Lattuada | 251/63.5 |

FOREIGN PATENT DOCUMENTS

| | | | |
|---|---|---|---|
| 868263 | 12/1941 | France . | |
| 1089774 | 3/1955 | France | 251/63 |
| 0066567 | 6/1981 | Japan | 251/63 |
| 760055 | 10/1956 | United Kingdom . | |

Primary Examiner—William A. Cuchlinski, Jr.
Assistant Examiner—W. Morris Worth
Attorney, Agent, or Firm—Marshall, O'Toole, Gerstein, Murray & Bicknell

[57] ABSTRACT

A device for controlling, in association with a stop valve, the gas stream delivered by a pressurized gas reservoir, whose casing is provided with an opening so that the inside of said reservoir may be connected to the outside. A cylinder is divided into a first chamber and a second chamber by a piston. The first chamber is in communication with the opening in the casing and includes an orifice which can be connected with the stop valve. A core is connected to the piston on the side thereof turned towards the first chamber. The core cooperating with the orifice so as to form a variable flow section as a function of the position of the piston in the cylinder. A passage with a non-return valve establishes communication between the first and second chambers of the cylinder. A controllable locking device is capable of locking the piston in the cylinder.

9 Claims, 5 Drawing Sheets

5,150,741

DEVICE FOR CONTROLLING THE GAS STREAM DELIVERED BY A PRESSURIZED GAS RESERVOIR AND A GAS SUPPLY SYSTEM COMPRISING SUCH A DEVICE

BACKGROUND OF THE INVENTION

The present invention relates to a device for controlling the gas stream delivered by a pressurized gas reservoir, the pressure of the gas inside said reservoir possibly reaching several hundreds of bars. It also relates to a gas supply system comprising such a device.

Although not exclusively, the present invention is particularly well adapted for use in composite reservoirs of known type, formed of an internal liner and an external shell of filament windings coated with synthetic resin. In such composite reservoirs, the internal liner provides sealing for the gas whereas the shell of filament windings provides the mechanical strength. In addition, it is generally provided for deformation of the internal liner under the effect of the internal pressure to be of plastic type, whereas deformation of the external shell is elastic. Thus, it is possible to obtain a linear elastic deformation for the reservoir as a function of the pressure.

Because of their excellent mechanical strength and their low weight, these composite reservoirs are widely used in space techniques for storing high pressure gas (up to 800 bars). For example, they contain, oxygen, hydrogen, helium or nitrogen for the requirements of an inhabited space craft, or else they store gases for pressurizing the propulsion ergols for launchers or satellites.

Of course, in order to be able to use the gas stored in such a reservoir, it is necessary to control the gas stream leaving said reservoir. For this, a succession of controlled pressure reducers is provided, whose opening is dependant on the evolution of the pressure in the reservoir. Considering the high pressures inside the reservoir and the safety and reliability requirements in the high pressure field, such pressure reducers and their controls are heavy (of the order of 25 kg), which is highly penalizing in the space field.

To avoid the drawbacks attached to the use of such pressure reducers, they could be replaced by a system with variable flow section orifice, controlled by control electronics as a function of the internal pressure in the reservoir, measured by an appropriate pressure sensor. The total weight of the reservoir and of its operating accessories could then be reduced. However, the result would be a sophisticated, expensive construction with relatively critical operation.

Therefore, the object of the present invention is to overcome these drawbacks and provide a pressurized gas reservoir, with control of the gas stream delivered, which both avoids the use of said pressure reducers and makes it possible to obtain a simple construction with reliable operation.

SUMMARY OF THE INVENTION

To this end, in accordance with the invention, the device for controlling, in association with a stop valve, the gas stream delivered by a pressurized gas reservoir, whose casing is provided with an opening by means of which the inside of said reservoir may be connected to the outside, is remarkable in that it comprises:

a cylinder divided into a first chamber and a second chamber by a piston, said first chamber being in communication with said opening in said casing and comprising an orifice which can be connected with said stop valve;

a core, fast with said piston on the side thereof turned towards said first chamber, said core cooperating with said orifice so as to form a variable flow section as a function of the position of said piston in said cylinder;

a passage with a non return valve, able to establish communication between said first and second chambers of said cylinder, and controllable locking means capable of locking said piston in position in said cylinder.

Thus, with said reservoir empty of gas, and said piston locked in position by said locking means, it is possible to connect said reservoir to a gas generator for filling it. During filling, said second chamber of the cylinder is filled with pressurized gas through said passage having the non return valve. When the reservoir is filled, the gas which it contains may serve for supplying a user device with gas. For this, the locking means are controlled for unlocking so that, under the action of the gas stored in said second chamber of the cylinder, the piston moves and causes the flow section to vary and so controls the gas stream delivered by the reservoir to the user device.

Preferably, said passage with a non return valve is formed through said piston.

Advantageously, the device comprises auxiliary resilient means for pressing said piston from said second chamber towards the first chamber.

Thus, the pressurized gas supply system according to the invention comprises, in combination:

a pressurized gas reservoir;

a stop valve for the gas stream delivered by said reservoir; and a device for controlling the gas stream, of the above specified type, disposed between said reservoir and said stop valve.

When it is desired to construct a compact system, said gas stream control device is mounted on said reservoir. On the other hand, when space requirements dictate it, said gas stream control device is disposed at a distance from said reservoir.

Preferably, the casing of said reservoir has a form of revolution. This casing may be formed of an internal liner and an external filament shell. It is advantageous for said internal liner to be plastically deformable and prestressed by said external filament shell.

BRIEF DESCRIPTION OF THE DRAWINGS

The figures of the accompanying drawings better show how the invention may be carried out. In these figures, identical references designate similar elements.

DESCRIPTION OF THE PREFERRED EMBODIMENTS

Figure 1A:
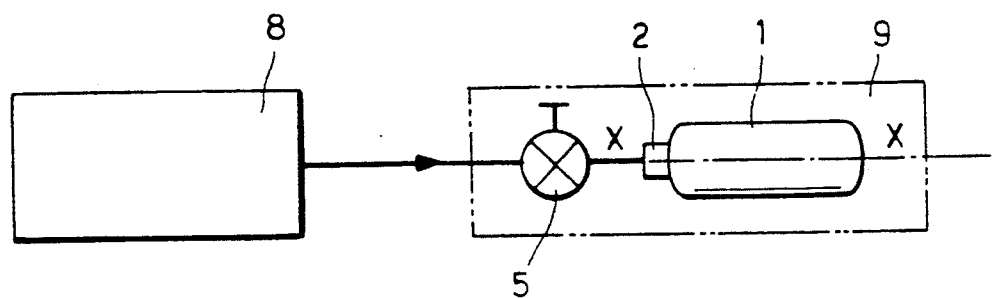
FIGS. 1a and 1b illustrate schematically, respectively the filling of a reservoir equipped with the device of the invention and a possible application of said reservoir.
Figure 1B:
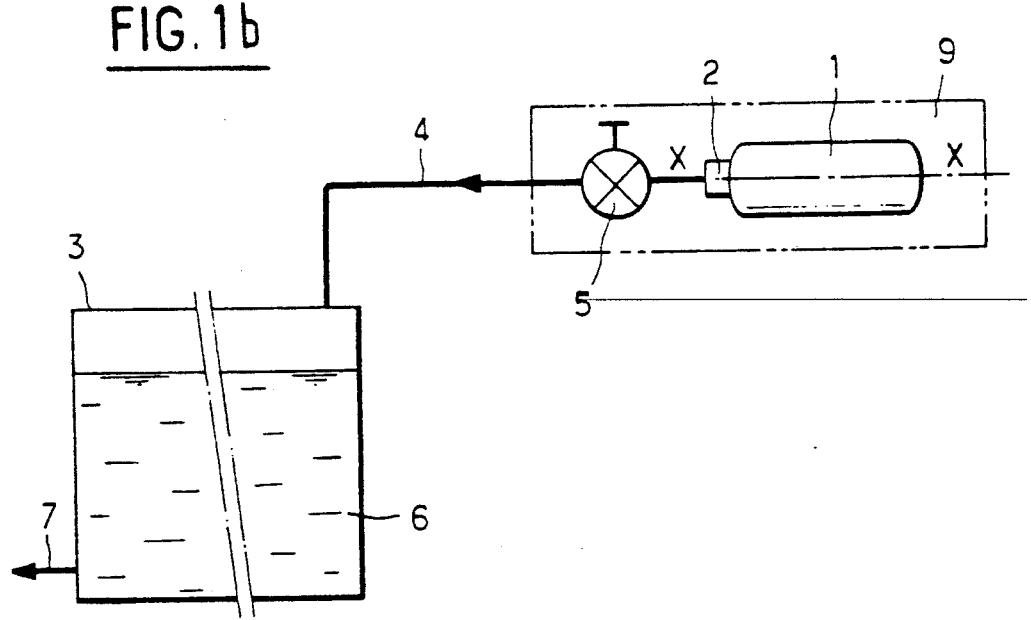

In FIGS. 1a and 1b, a pressurized gas reservoir 1 has been shown equipped with a flow control device 2 in accordance with the invention, said reservoir being intended to supply an enclosure 3 with gas, via a connection 4 and a stop valve 5. Enclosure 3, which has a considerable volume, contains a liquid 6, which is driven out of enclosure 3 through an outlet 7 under the pressure of the gas previously stored in said reservoir 1.

As shown schematically in FIG. 1a, the reservoir 1 is filled with pressurized gas via a gas generator 8 (compressor, pressurized gas cylinder, etc . . . ), which transfers said gas to it through said valve 5 and said flow control device 2, the assembly formed by reservoir 1, device 2 and valve 5 forming a unitary storage and supply system 9. Of course, during filling of reservoir 1 with gas, the stop valve 5 (which is then upstream of device 2 for the flow direction of the filling gas) is open so that gas can be transferred from generator 8 to reservoir 1. When filling is finished to the desired pressure in said reservoir 1, valve 5 is closed and system 9 is disconnected from the gas generator 8 to be mounted on the connection 4 (FIG. 1b). Opening of valve 5 then allows enclosure 3 to be supplied. During the supply of gas to said enclosure 3 from reservoir 1, stop valve 5 is downstream of device 2 for the flow direction of the supply gas.

As will be described hereafter, device 2 makes it possible to control the gas stream in connection 4 when the stop valve 5 is open.

For reasons of space and weight, the volume of the reservoir 1 must be as small as possible; consequently, the initial pressure of the gas therein must be high so that the liquid 6 is pressurized to a level higher than a given threshold (for example 10 bars), even when there only remains a little liquid 6 in enclosure 3.

In FIGS. 1a and 1b, the reservoir 1 is shown in the form of a cylindrical bottle with axis X—X, whose ends are domes, for example hemispherical.

Of course, reservoir 1 could have any other appropriate shape, for example spherical.

Figure 2:
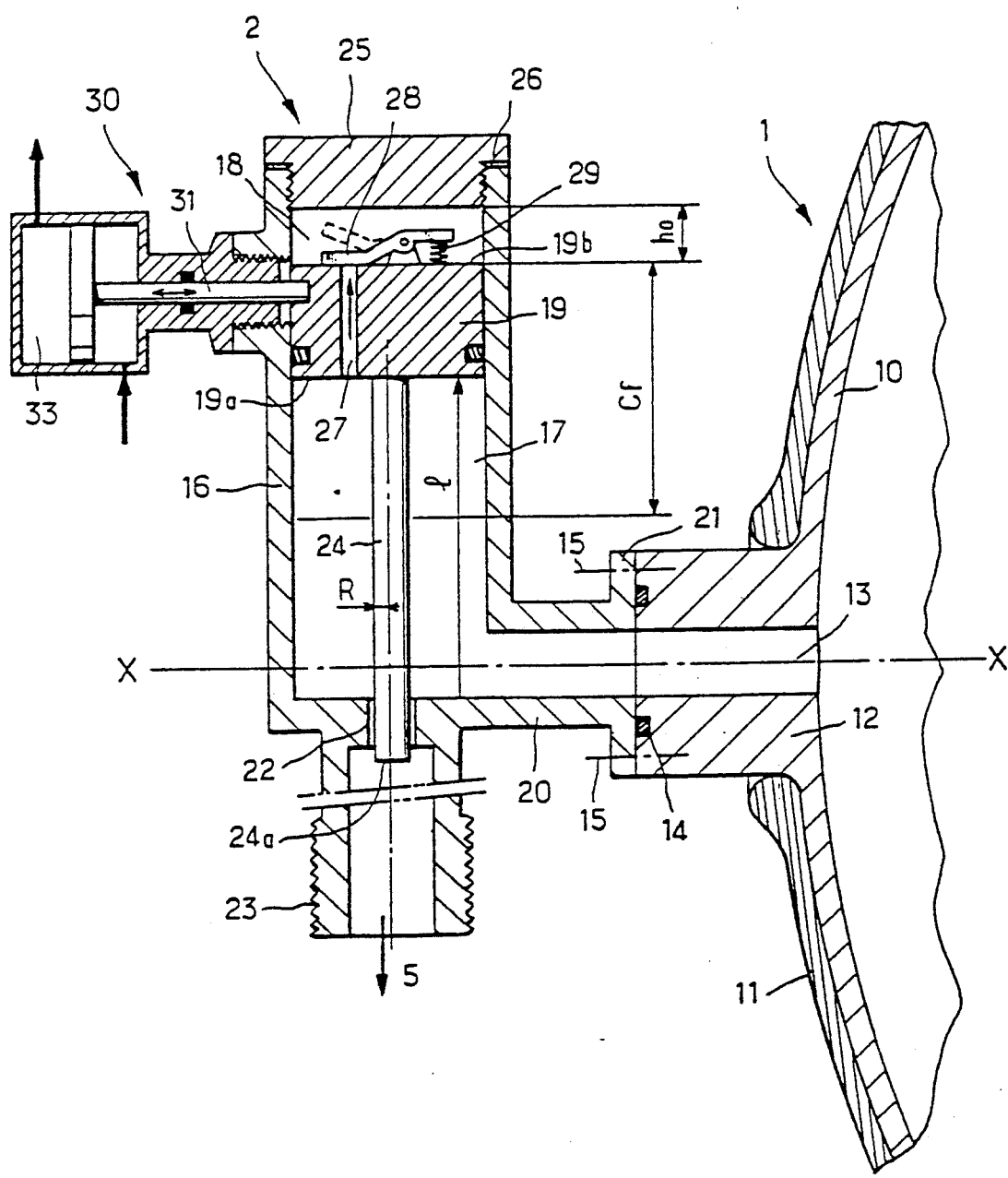
FIG. 2 shows, in axial section and on a larger scale, one embodiment of the control device according to the present invention, the associated reservoir only being shown partially and the control device being in a position corresponding to the state of said reservoir before filling, to the state during filling or else to the filled state waiting to be used.
Figure 3:
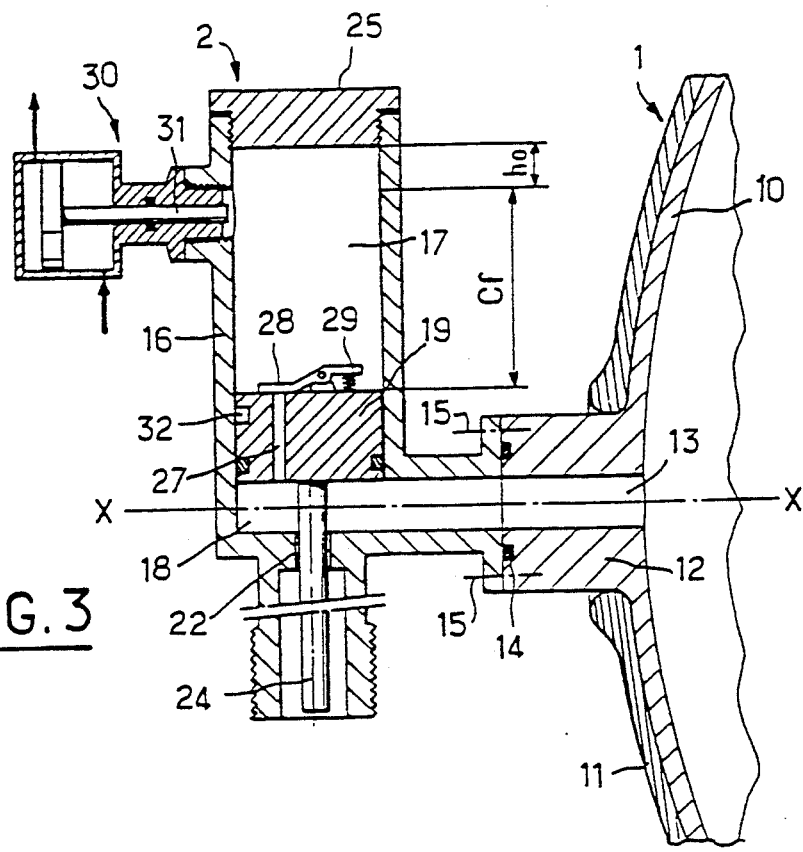
FIG. 3 is an axial sectional view similar to that of FIG. 2, said control device being in its position corresponding to the end of emptying of said reservoir.
Figure 4:
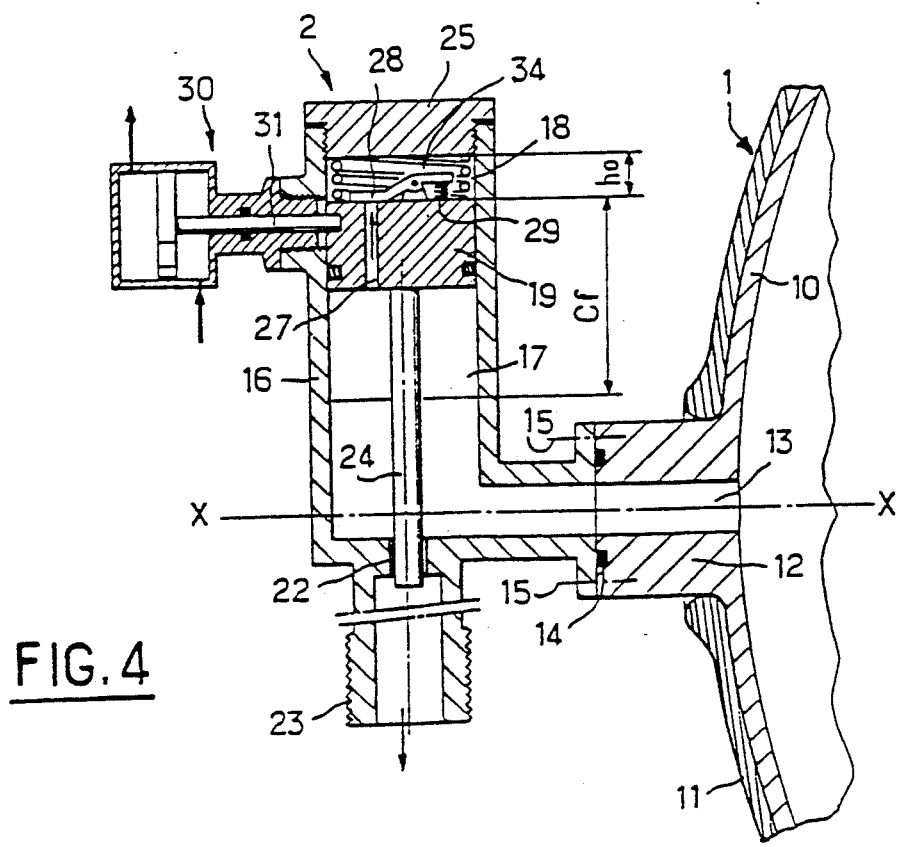
FIG. 4 is a view similar to FIG. 2, illustrating an additional feature of said control device according to the invention.

Reservoir 1, shown schematically and partially in FIGS. 2 to 4 by way of example, is such that its casing comprises an internal liner 10, made from a metal such for example as aluminium or titanium, supporting a shell 1 formed of filament windings composed of resistant fibers (glass, carbon, Kevlar (registered trademark), etc . . . ) coated with polymerized resin.

The internal metal liner 10 has, facing device 2, an end piece 12 defining an opening 13.

Reservoir 1 may advantageously have been subjected to a prepatory pressurizing operation (end piece 12 serving for introducing a pressurized fluid) such that the elastic deformation limit of the internal metal liner is exceeded, without this being the case for shell 11, whose elastic deformation limit is much higher. Thus, deformation by expansion of the internal metal liner 10 takes place in the plastic range and, during return to atmospheric pressure of reservoir 1, said internal metal liner 10 is in a prestressed condition by the elastic action of shell 11. The result is in addition that, when reservoir 1 is subjected to subsequent pressurization greater than that of said preparatory operation, the deformation of reservoir 1 becomes proportional to the pressure applied.

As is shown by FIGS. 2 to 4, a control device 2 is fixed sealingly on end piece 12 by means of a seal 14 and fixing means 15 (only shown by the line of their axis).

The control device 2 comprises a cylinder 16, divided into two chambers 17 and 18 by a piston 19. Chamber 17 is in communication with opening 13 of the casing (10, 11) through a duct 20, ending for example in a flange 21 for fixing said device 2 on the end piece 12 by means of said fixing means 15. Furthermore, said chamber 17 comprises an orifice 22 causing it to communicate with a connection 23, fast with cylinder 16 and permitting fixing of the stop valve 5 (not shown in FIGS. 2 to 4).

An elongate core 24 is carried by face 19a of piston 19 and is directed towards chamber 17 and engaged in orifice 22. Orifice 22 and core 24 are intended, through their cooperation, to form therebetween a variable flow section as a function of the position of piston 19 in cylinder 16. Of course, their respective sections and/or the variations of their respective sections along their axes are chosen so as to obtain, for each successive position of piston 19 in cylinder 16, the flow section corresponding to the desired flow. However, for the sake of simplification, in FIGS. 2 to 4, orifice 22 has been shown in the form of a simple calibrated cylindrical hole, whereas core 24 is shown as being a rod with conical section, having a smaller diameter on the piston 19 side than at its free end 24a.

On the side opposite piston 19, chamber 18 is sealingly closed by a screwable plug 25, with interpositioning of a seal 26.

A passage 27 is formed through piston 19, for connecting together the opposite faces 19a and 19b thereof. A valve 28, loaded by a spring 29, is disposed on face 19b of piston 19, turned towards chamber 18, for closing said passage 27.

Moreover, device 2 comprises locking means 30, capable of locking piston 19 in a position such that said piston is spaced away from orifice 22. In this locked position of piston 19, chamber 18 may be relatively small (with respect to chamber 17) and the free end 24a of core 24 is already engaged in orifice 22.

The locking means 30 comprise a retractable pin 31 penetrating into a corresponding recess 32 of piston 19 and actuated by drive means 33. In FIGS. 2 to 4, said drive means 33 have been shown schematically in the form of a jack, but they could of course be formed differently, for example in the form of an electromagnet.

With the control device 2 in the position shown in FIG. 2 (piston 19 being locked in the position distant from orifice 22) and being connected to reservoir 1 and to stop valve 5 so as to form system 9, the system is connected to the gas generator 8. As soon as the stop valve 5 is open, gas coming from said generator 8 penetrates into the cylinder chamber 17, through said valve 5, connection 23 and the annular space defined between core 24 and orifice 22, then into reservoir 1 through opening 13. As soon as the pressure in chamber 17 is greater than the action of spring 29, valve 28 rises (see the broken line position in FIG. 2) and gas passes into chamber 18 through passage 27. When the gas pressure inside reservoir 1 reaches a desired value, the stop valve 5 is closed, cutting off generator 8 from said reservoir. At this time, the pressures in chambers 17 and 18 are balanced and valve 28 closes again under the action of spring 29, again closing said passage 27.

Thus, in the gas storage position, reservoir 1, chamber 17 and chamber 18 are at the same gas pressure (except for the action of spring 29 of valve 28).

If, now, unit 9 is disconnected from generator 8, to be connected to the connection 4 to enclosure 3, nothing happens as long as the stop valve 5 is closed.

On the other hand, when the stop valve 5 is opened and pin 31 is removed simultaneously, two actions occur: on the one hand, gas stored in reservoir 1 passes through the annular space defined between core 24 and orifice 22 in the direction of enclosure 3 causing the pressure in reservoir 1 and chamber 17 to drop and, on the other hand, piston 29 is pushed by the pressurized gas contained in chamber 18 (valve 28 remaining closed). The result is not only that the enclosure 3 is supplied with gas, but the core 24 moves with respect to orifice 22, i.e. the flow section of the gas through said orifice 22 varies as a function of the stroke of said piston.

It can be seen that by appropriately choosing the profiles of orifice 22 and core 24, it is possible to control to any desired instantaneous value the flow rate of the gas stream between reservoir 1 and enclosure 3, during movement of said piston 19.

At the end of travel of piston 19 (see FIG. 3), the pressure between chambers 17, 18 and reservoir 1 is again balanced.

If the expansion of the gas imprisoned in chamber 18 (which produces movement of piston 19) takes place with constant enthalpy, we may write:

$$V(t) = \frac{(Po)^{\frac{1}{\gamma}}}{P(t)} Vo \quad (1)$$

in which expression
V(t) is the volume of chamber 18 at time t of the expansion,
P(t) is the gas pressure inside chamber 18 at said time t,
Vo is the initial volume of chamber 18 (FIG. 2),
Po is the initial gas pressure inside chamber 18, this pressure Po being practically equal (except for the action of spring 29) to the storage pressure of the gas in reservoir 1, and
$\gamma$ is the constant of the ideal gases for the gas considered.

Since the internal section of cylinder 16 is constant by structure, we can write:

$$\frac{Vo}{V(t)} = \frac{ho}{C(t)} \quad (2)$$

in which expression
ho is the initial height of chamber 18 (FIG. 2) and
C(t) is the distance travelled by piston 19 at time t.

We can thus see that the distance C(t) depends on the pressures Po and P(t).

If, at the end of expansion of the gas in chamber 18 balance of piston 19 is obtained for a residual pressure Pf, we may write $$\frac{Cf}{ho} = \frac{(Po)^{\frac{1}{\gamma}}}{Pf} \quad (3)$$

Cf being the total travel distance of piston 19. Thus this distance is readily determined from ho, Po and Pf.

As shown in FIG. 4, it may be advantageous to provide a compression spring 34, in chamber 18, bearing for example on plug 25 and the face 19a of piston 19. Thus, the drawbacks which would be due to possible liquefaction of the gas contained in chamber 18 during its expansion would be overcome.

Using the device shown in FIGS. 2 and 3, tests were carried out with nitrogen and helium.

Figure 5A:
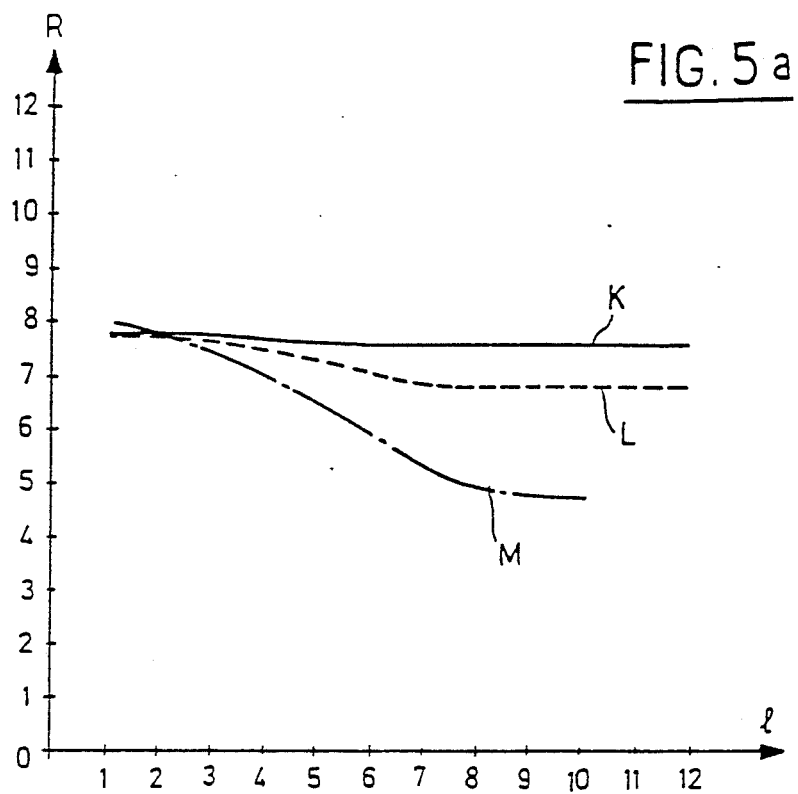
FIGS. 5a, 5b, 6a and 6b are diagrams illustrating tests carried out with the device of the invention.
Figure 5B:
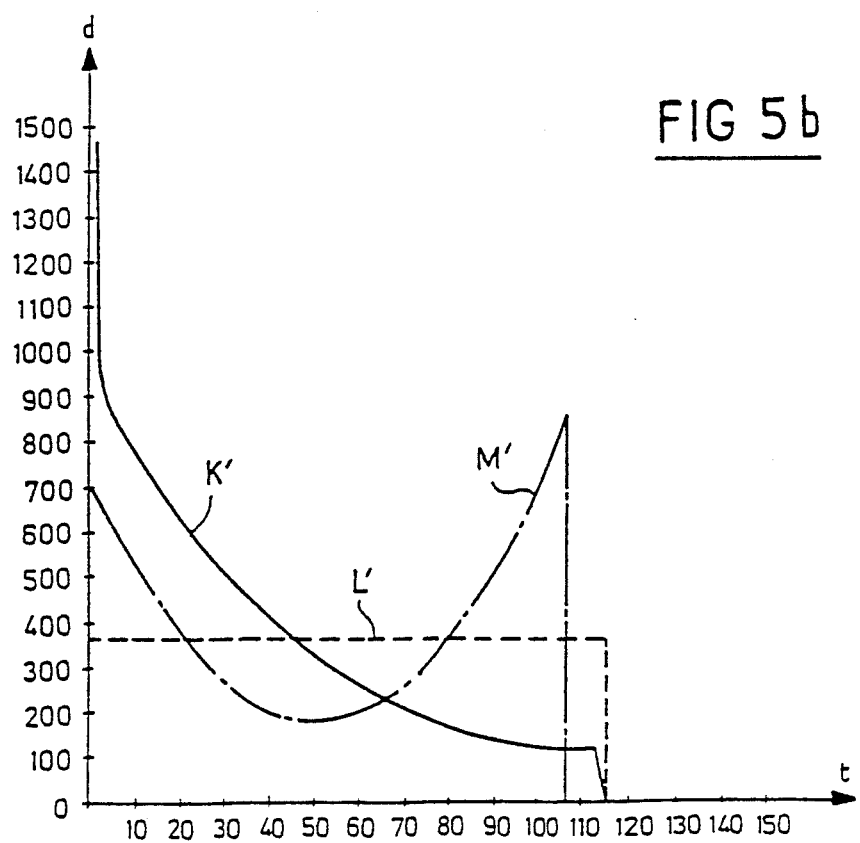

1. In diagrams 5a and 5b are shown the results of tests with nitrogen, with an initial pressure Po=320 bars, a final pressure Pf=10 bars and an initial height ho=10 mm. In this case, the radius of orifice 22 was chosen equal to 8 mm. Diagram 5a gives the evolution of the radius R of core 24 (in mm) as a function of its length l (also in mm), reckoned from the orifice 22 in the direction of piston 19 (see FIG. 2). Diagram 5b gives the gas flow rate d (in grams per second) through connection 23 as a function of time t in seconds:
   if radius R follows the variation given by curve K of FIG. 5a, the flowrate d follows curve K' of FIG. 5b, corresponding to a constant volume flow;
   if radius R follows the variation given by curve L of FIG. 5a, the flowrate d follows curve L' of FIG. 5b, corresponding to a constant mass flow; and
   if radius R follows the variation given by curve M of FIG. 5a, the flowrate d follows the parabolic curve M' of FIG. 5b.

Figure 6A:
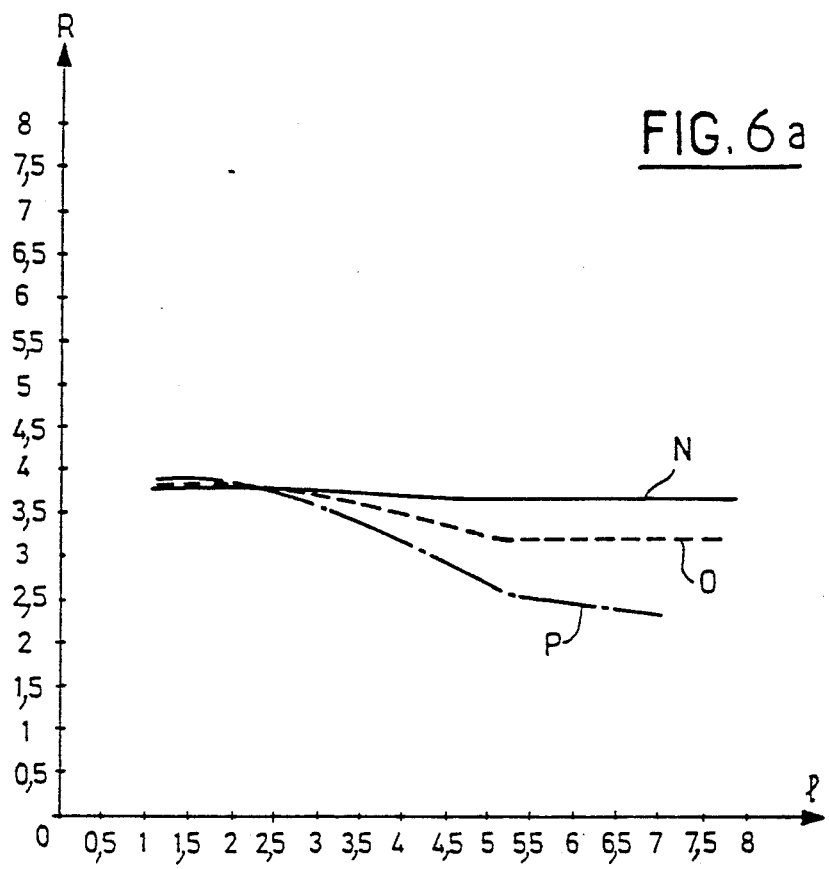
Figure 6B:
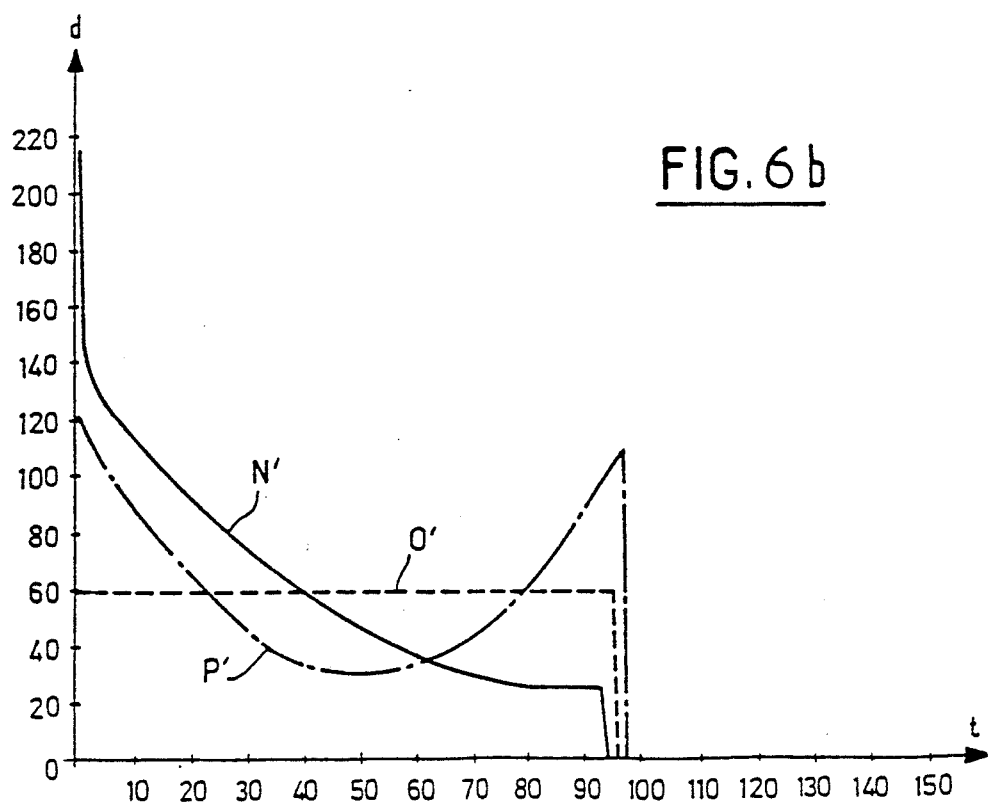

2. Diagrams 6a and 6b sum up the results of the tests with helium, the magnitudes Po, Pf and ho having the same values as above, but orifice 22 then having a radius of 4 mm. The references R, l, d and t have the same meanings as in connection with FIGS. 5a and 5b. We can see that:
   if radius R of core 24 follows the variation given by curve N of FIG. 6a, the flowrate d follows curve N' of FIG. 6b, corresponding to a constant volume flow;
   if radius R follows the variation given by curve O of FIG. 6a, the flowrate d follows curve O' of FIG. 6b, corresponding to a constant mass flow; and
   if radius R follows the variation given by curve P of FIG. 6a, the flowrate d follows the parabolic curve P' of FIG. 6b.

The tests carried out, illustrated in FIGS. 5a, 5b, 6a and 6b, show then the extreme flexibility of the device in accordance with the invention in so far as the control of the gas flow from the reservoir 1 is concerned.

What is claimed is:

1. A device for controlling the rate of flow of a gas stream from a pressurized gas reservoir having a casing provided with a first opening through which pressurized gas within said reservoir can flow to the outside of said reservoir, said device comprising:
    a cylinder having one closed end;
    a movable piston within said cylinder dividing said cylinder into a first chamber and a second closed chamber;
    said first chamber being adapted to receive a flow of gas from said first opening and being provided with an orifice through which a controlled stream of gas can flow out of said first chamber;
    a conduit for gas flow from said first opening to said first chamber;
    an elongated core connected to said piston and located within said first chamber,
    said core passing through and cooperating with said orifice to define a second opening having a variable flow section as a function of the position of said piston in said cylinder;

a passage establishing gaseous communication between said first and second chambers of said cylinder;

a non-return valve associated with said passage permitting flow of gas from said first chamber to said second chamber but preventing flow of gas from said second chamber to said first chamber; and controllable locking means for locking said piston in position in said cylinder.

2. The device as claimed in claim 1, wherein said passage passes through said piston.

3. The device as claimed in claim 1, further comprising auxiliary resilient means for pressing said piston away from said second chamber and towards said first chamber.

4. Pressurized gas supply system comprising in combination:

a reservoir containing a pressurized gas;

said reservoir having a first opening through which gas can flow out of said reservoir;

a device for controlling the rate of flow of gas from said first opening, said device comprising:

a cylinder having one closed end;

a movable piston within said cylinder dividing said cylinder into a first chamber and a second closed chamber;

said first chamber being adapted to receive a flow of gas from said first opening and being provided with an orifice through which a controlled stream of gas can flow out of said first chamber;

a conduit for gas flow from said first opening to said first chamber;

an elongated core connected to said piston and located within said first chamber, said core passing through and cooperating with said orifice to define a second opening having a variable flow section as a function of the position of said piston in said cylinder;

a passage establishing gaseous communication between said first and second chambers of said cylinder;

a non-return valve associated with said passage permitting flow of gas from said first chamber to said second chamber but preventing flow of gas from said second chamber to said first chamber;

controllable locking means for locking said piston in position in said cylinder;

and a stop valve in fluid communication with said orifice for stopping the flow of gas delivered by said reservoir.

5. The system as claimed in claim 4, wherein said gas flow control device is mounted on said reservoir.

6. The system as claimed in claim 4, wherein said gas flow control device is disposed at a distance from said reservoir.

7. The system as claimed in claim 4, wherein said reservoir comprises a casing in the form of a cylinder of revolution.

8. The system as claimed in claim 4, wherein said reservoir comprises a casing formed of an internal liner and an external filament shell.

9. The system as claimed in claim 8, wherein said internal liner is plastically deformable and prestressed by said external filament shell.

* * * * *